US007437353B2

(12) United States Patent
Marmaros et al.

(10) Patent No.: US 7,437,353 B2
(45) Date of Patent: Oct. 14, 2008

(54) SYSTEMS AND METHODS FOR UNIFICATION OF SEARCH RESULTS

(75) Inventors: David Marmaros, Mountain View, CA (US); Nikhil Bhatta, Sunnyvale, CA (US); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 499 days.

(21) Appl. No.: 10/749,998

(22) Filed: Dec. 31, 2003

(65) Prior Publication Data

US 2005/0149500 A1 Jul. 7, 2005

(51) Int. Cl.
*G06F 17/30* (2006.01)

(52) U.S. Cl. .................... 707/3; 707/3; 707/4; 707/5
(58) Field of Classification Search ................ 707/3–10
See application file for complete search history.

(56) References Cited

U.S. PATENT DOCUMENTS

| 5,826,261 | A | * | 10/1998 | Spencer ........................ 707/5 |
| 6,006,222 | A | | 12/1999 | Culliss |
| 6,014,665 | A | | 1/2000 | Culliss |
| 6,078,916 | A | | 6/2000 | Culliss |
| 6,101,491 | A | | 8/2000 | Woods |
| 6,182,068 | B1 | | 1/2001 | Culliss |
| 6,581,056 | B1 | | 6/2003 | Rao |
| 6,601,061 | B1 | * | 7/2003 | Holt et al. ..................... 707/3 |
| 6,611,862 | B2 | * | 8/2003 | Reisman ..................... 709/217 |
| 6,633,873 | B1 | * | 10/2003 | Nakamura ..................... 707/10 |
| 6,795,820 | B2 | * | 9/2004 | Barnett ........................... 707/3 |
| 6,976,053 | B1 | | 12/2005 | Tripp et al. |
| 2002/0147704 | A1 | | 10/2002 | Borchers |
| 2003/0084032 | A1 | * | 5/2003 | Grewal et al. ................... 707/3 |
| 2003/0144924 | A1 | * | 7/2003 | McGee ........................ 705/27 |
| 2003/0167266 | A1 | | 9/2003 | Saldanha et al. |
| 2004/0143569 | A1 | * | 7/2004 | Gross et al. ..................... 707/3 |

FOREIGN PATENT DOCUMENTS

WO WO98/12881 3/1998

(Continued)

OTHER PUBLICATIONS

U.S. Appl. No. 10/749,440, filed Dec. 31, 2003, Badros et al.

(Continued)

*Primary Examiner*—Don Wong
*Assistant Examiner*—Hanh B Thai
(74) *Attorney, Agent, or Firm*—Fenwick & West LLP

(57) ABSTRACT

Systems and methods for the unification of search results are described. In one described system, a program, such as a search engine, executing on a client device receives a search query. The search engine executes the search on a local index and receives a first result set, which is relevant to the query entered by the user. The search query is also executed against a global index. The search engine receives a second result set from the global index. Once the search engine has received both result sets, the search engine combines the result sets to create a combined result set. The search engine may cause the combined result set to be displayed or otherwise output to a user.

43 Claims, 3 Drawing Sheets

FOREIGN PATENT DOCUMENTS

| | | |
|---|---|---|
| WO | WO01/16807 A1 | 3/2001 |
| WO | WO03/036520 A1 | 5/2003 |

OTHER PUBLICATIONS 80-20 Software—Products—80-20 One Search, http://www.80-20.com/products/one-search/retriever.asp, printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-technologies.com/products/devonthink.php, printed Mar. 16, 2004.

dtSearch® -http://www.dtsearch.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http;//www.isysusa.com/products/desktop/index.html, printed Mar. 16, 2004.

Joachims, T., et al., "Web Watcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article-php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, htp://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

International Search Report and Written Opinion, PCT/US2004/039366, Feb. 28, 2005.

* cited by examiner

SYSTEMS AND METHODS FOR UNIFICATION OF SEARCH RESULTS

RELATED APPLICATION

This application relates to application Ser. No. 10/749,434, filed herewith, titled "Methods and Systems for Improving a Search Ranking Using Article Information," the entirety of which is incorporated herein by reference. This application also relates to application Ser. No. 10/749,620, filed herewith, titled "Methods and Systems for Improving a Search Ranking By Propagating a Ranking Score Based in Part on Client-Side Behavior Data," the entirety of which is incorporated herein by reference.

FIELD OF THE INVENTION

The present invention relates generally to methods and systems for query result presentation. The present invention relates particularly to methods and systems for unification of search results.

BACKGROUND

Conventional search engines receive a search query from a user and execute a search against a global index. A search engine performs the search based on a conventional search method. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search results are often presented in a list format, comprising article identifiers and brief snippets about the documents in a web page that can be resized.

Other applications, such as email applications, allow a user to perform a search against a local index, such as the email message store. However, users of conventional systems are unable to perform a search against a local and a global index and have the results combined in an effective manner.

Thus, a need exists to provide effective systems and method for unification of search results.

SUMMARY

Embodiments of the present invention provide systems and methods for unification of search results. In one embodiment of the present invention, a program, such as a search engine, executing on a client device receives a search query. The search engine executes the search on a local index and receives a first result set, which is relevant to the query entered by the user. The search query is also executed against a global index. The search engine receives a second result set from the global index. Once the search engine has received both result sets, the search engine combines the result sets to create a combined result set. The search engine may cause the combined result set to be displayed or otherwise output to a user.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
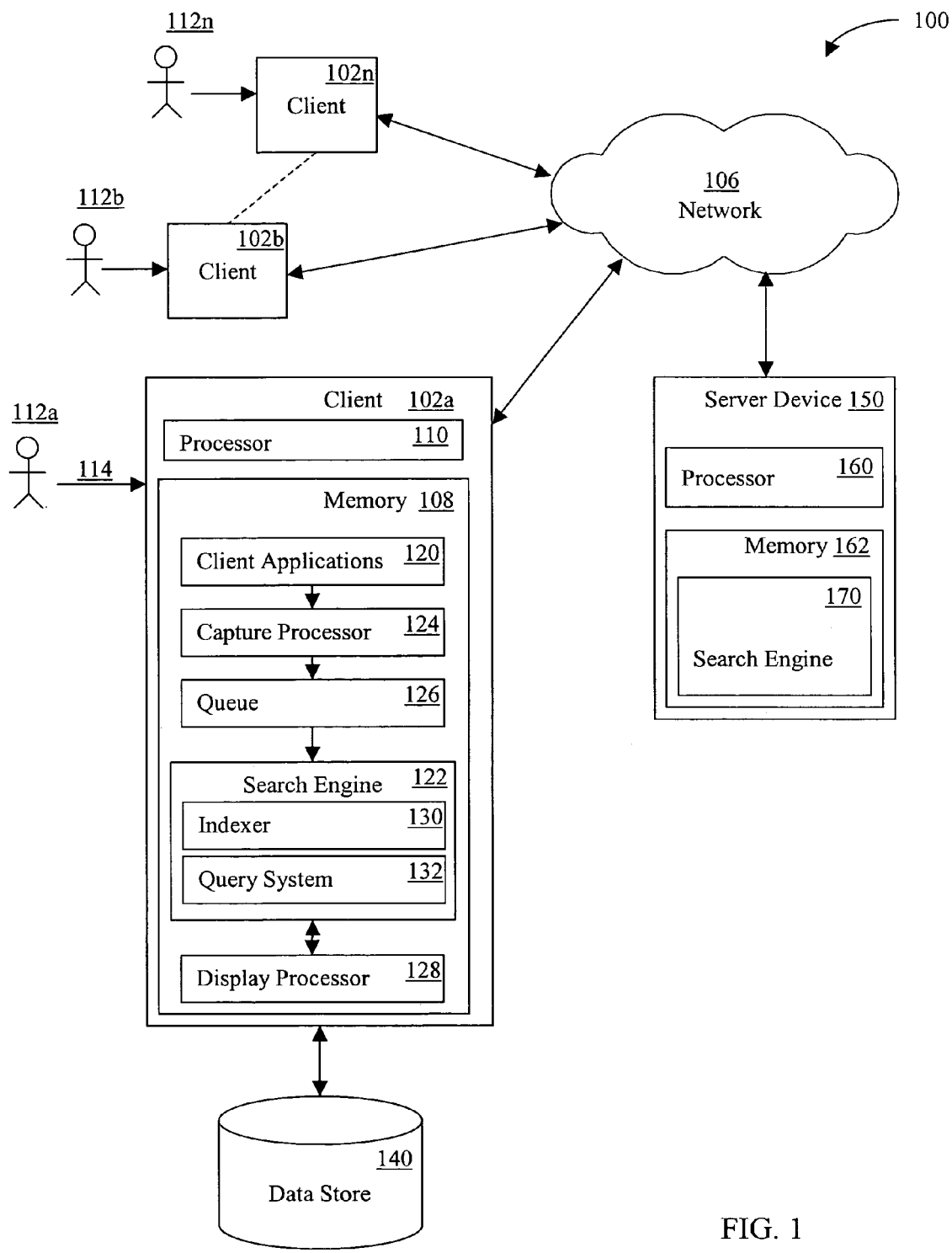
FIG. 1 is a block diagram illustrating an exemplary environment in which one embodiment of the present invention may operate.

Embodiments of the present invention provide systems and methods for unification of search results. Referring now to the drawings in which like numerals indicate like elements throughout the several figures, FIG. 1 is a block diagram illustrating an exemplary environment for implementation of an embodiment of the present invention. While the environment shown reflects a client-side search engine architecture embodiment, other embodiments are possible. The system 100 shown in FIG. 1 includes multiple client devices 102a-n in communication with a server device 150 over a wired or wireless network 106. The network 106 shown comprises the Internet. In other embodiments, other networks, such as an intranet, may be used instead. Moreover, methods according to the present invention may operate within a single client device.

The client devices 102a-n shown each includes a computer-readable medium 108. The embodiment shown includes a random access memory (RAM) 108 coupled to a processor 110. The processor 110 executes computer-executable program instructions stored in memory 108. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor 110 of client 102a, with computer-readable instructions. Examples of suitable computer readable storage medium include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also include a number of external or internal devices such as a mouse, a CD-ROM, DVD, a keyboard, a display, or other input or output devices. Examples of client devices 102*a-n* are personal computers, digital assistants, personal digital assistants, cellular phones, mobile phones, smart phones, pagers, digital tablets, laptop computers, Internet appliances, and other processor-based devices. In general, the client devices 102*a-n* may be any type of processor-based platform that operates on any operating system, such as Microsoft® Windows® or Linux, capable of supporting one or more client application programs. For example, the client device 102*a* shown comprises a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, and any other application capable of being executed by a client device.

The user 112*a* can interact with the various client applications 120 and articles associated with the client applications 120 via various input and output devices of the client device 102*a*. Articles include, for example, word processor, spreadsheet, presentation, e-mail, instant messenger, database, and other client application program content files or groups of files, web pages of various formats, such as HTML, XML, XHTML, Portable Document Format (PDF) files, and audio files, video files, or any other documents or groups of documents or information of any type whatsoever.

The memory 108 of the client device 102*a* shown also contains a capture processor 124, a queue 126, and a search engine 122. The client device 102*a* shown also contains or is in communication with a data store 140. The search engine 122 can receive an explicit query from the user 112*a* or generate an implicit query and retrieve information from the data store 140 in response to the query.

The search engine 122 shown comprises an indexer 130, a query system 132, and a formatter 134. Real time events can be provided by the queue 126 to the query system 132 upon request to provide the query system 132 with information concerning current user context. The queue 126 may also notify the query system 132, and the indexer 130, when new events are available. Real time events may include contextual and indexable events. In one embodiment, performance data is stored in a performance management system (not shown) rather than in the queue 126. The performance management system is available to a component that requires access to current performance data. The query system 132 can use information from the queue 126 to generate an implicit query. The query system 132 can also receive and process explicit queries from the user 112*a*. The data store 140 comprises a computer-readable media. The data store 140 maybe integrated with the client device 102*a*, such as in the case of a hard drive, or may be external to the client device 102*a*, such as in the case of an external hard drive or on another data storage device accessed through the network 106. The data store 140 may include one or a combination of methods for storing data, including without limitation, arrays, hash tables, lists, and pairs.

In the embodiment shown in FIG. 1, a user 112*a* can input an explicit query into a search engine interface displayed on the client device 102*a*, which is received by the search engine 122. The search engine 122 can also generate an implicit query based on a current user context or state, which can be determined by the query system 132 from contextual real time events. Based on the query, the query system 132 can locate relevant information in the data store 140 and provide a result set. In one embodiment, the result set comprises article identifiers identifying articles associated with the client applications 120 or client articles. Client articles stored in the data store 140 include articles associated with the user 112*a* or client device 102*a*, such as the word processing documents, previously viewed web pages and any other article associated with the client device 102*a* or user 112*a*. In another embodiment, the result set also comprises identifiers identifying articles located on the network 106 or network articles located by a search engine on a server device. Network articles include articles located on the network 106 not previously viewed or otherwise referenced by the user 112*a*, such as web pages not previously viewed by the user 112*a*.

The result sets comprise one or more article identifiers. An article identifier may be, for example, a uniform resource locator (URL), a file name, a link, an icon, a path for a local file, or anything else that identifies an article. In the embodiment shown, an article identifier comprises a URL associated with an article.

Messaging articles stored in the data store 140 include user's emails, chat messages, and instant messaging messages. Each time a message is received, sent, modified, printed, or otherwise accessed, a record is stored in the data store 140. This information can later be searched to identify messages that should be displayed in the user interface.

An embodiment of the present invention may also store message threads in the data store 140. In such an embodiment, messages are related together by various attributes, including, for example, the sender, recipient, date/time sent and received, the subject, the content, or any other attribute of the message. The related messages can then be retrieved as a thread, which may be treated as a document by the display processor 128.

The formatter 134 can receive the search result set from the query system 132 of the search engine 122 and can format the results for output to a display processor 128. In one embodiment, the formatter 134 formats the results in XML or HTML. The display processor 128 can be contained in memory 108 and can control the display of the result set on a display device associated with the client device 102*a*. The display processor 128 may comprise various components. For example, in one embodiment, the display processor 128 comprises a hypertext transfer protocol (HTTP) server that receives requests for information and responds by constructing and transmitting hypertext markup language (HTML) pages. In one such embodiment, the HTTP server comprises a scaled-down version of the Apache Web server. In various embodiments, the functions described herein may be performed by various other components and devices.

Through the client devices 102*a-n*, users 112*a-n* can communicate over the network 106, with each other and with other systems and devices coupled to the network 106. As shown in FIG. 1, a server device 150 is also coupled to the network 106. In the embodiment shown, the search engine 122 can transmit a search query comprised of an explicit or implicit query or both to the server device 150. The user 112*a* can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown includes a server executing a search engine application program, such as the Google™ search engine. Similar to the client devices 102*a-n*, the server device 150 shown includes a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 122 then provides the result set to the client device 102a via the network 106. The result set 134 comprises one or more article identifiers. An article identifier may be, for example, a uniform resource locator (URL), a file name, a link, an icon, a path for a local file, or anything else that identifies an article. In the embodiment shown, an article identifier comprises a URL associated with an article.

In the embodiment shown, the server device 150, or related device, has previously performed a crawl of the network 106 to locate articles, such as web pages, stored at other devices or systems connected to the network 106, and indexed the articles in memory 162 or on another data storage device.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to explain the exemplary methods shown in FIG. 2.

Various methods may be implemented in the environment shown in FIG. 1 and other environments according to the present invention. Methods according to the present invention may be implemented by a processor-executable program code stored on a computer-readable medium. In one embodiment of the present invention, a program, such as a search engine 122, executing on the client device 102a receives a search query. The search engine 122 receives the search query in response to the user 112a submitting a search query 114 against a global index, such as a query executed by the Google™ search engine. An example of a global index is an index of articles on the Word Wide Web.

The search engine 122 receives result in no particular order. For example, in one embodiment, the search engine 122 receives the result set from the local index first and subsequently receives the result set from the global index. In another embodiment, the local search does not begin until the search engine receives the result set or at least a portion of the result set from the global index.

The search engine 122 executes the search on the local index and receives a first result set, which is relevant to the query 114 entered by the user 112a. The search query 114 is also executed against the global index. The search engine 122a receives a second result set from the global index in response to the search query 114. Once the search engine 122 has received both result sets, the search engine 122 combines the result sets to create a combined result set.

The terms first and second are used here merely to differentiate one item from another item. The terms first and second are not used to indicate first or second in time, or first or second in a list, or other order, unless explicitly noted. For example, the "second" may come in time or in list before the "first," unless it is otherwise explicitly indicated.

The search engine 122 may provide the combined result set in various ways. For example, in one embodiment, the search engine merges the result sets and ranks the resulting merged results. The search engine 122 may then generate a user interface or may instead pass the merged result sets to another component, such as the display processor 128, which then generates the user interface. In another embodiment, the search engine 122 highlights results appearing in both result sets.

The interface provided to the user may be created based on user-supplied or other parameters. For example, in one embodiment, the user 112a specifies a maximum number of results that may be displayed at any one time. In one such embodiment, the search engine 122 identifies a first article identifier in the first result set and replaces a second article identifier in the second result set with the first article, ranking the article identifiers while maintaining the maximum number of article identifiers that the user has specified to be displayed in a user interface.

Various components, including the search engine 122, may perform methods according to the present invention. For example, in one embodiment, a browser plug-in intercepts the query 114 by the user 112a, causes the local search to be performed by the search engine 122, and combines the result sets from the local and global indices. In another embodiment, a proxy server performs methods according to the present invention. In yet another embodiment, a network monitor or firewall performs methods according to the present invention. Various other architectures may also be used.

In one embodiment, a network monitor recognizes search requests as they are sent to a global search index, for example recognizing a HTTP GET request for a search on a web search engine. Upon recognizing the request, the system generates a second request to a local index, where the second request is based at least in part on the request sent to the global index. For example, the second request may be identical to the first request, or may be modified for example using synonyms or with context based on the user's activities. The local index request and the global index request now operate in parallel. The system recognizes when the global index responds with a result set, and combines the result sets from the local and global indexes. If the local index request completes prior to the global index request, the local index request is cached for rapid retrieval and combined display when the global index request is received. If the global index request completes before the local index request, the system optionally waits (up to an optional maximum amount of time) for the local index response or displays only the global index response.

In embodiments of the present invention, the local index comprises a store of data about content local to the user 112a or to the client 102a. For example, in one embodiment, the local index comprises a database, such as a database stored in the data store 140. Such a database or other data store may comprise a pre-generated result set. For example, the local search engine 122 may archive result sets from searches that the user 112a performs often. The local content in the local index may comprise a list of files, an email application comprising email messages and email threads, a chat application comprising chat messages and chat threads, or any other type of content local to a user.

Content local to a user is not limited to content present on or related to the client device 102a. Content local to a user includes user activity, files, and applications that involve solely the client device 102a and also includes activity, files, and applications that involve other systems or networks, including, for example, the web.

The results are presented to the user in a user interface. The user interface may comprise an HTML document that is similar to the results provided by a conventional search engine, such as the Google™ search engine. In one embodiment, the combined result set is provided in a user interface with the content from the global and local indices separated onto different sections of the user interface. Other implementations may be utilized.

Figure 2:
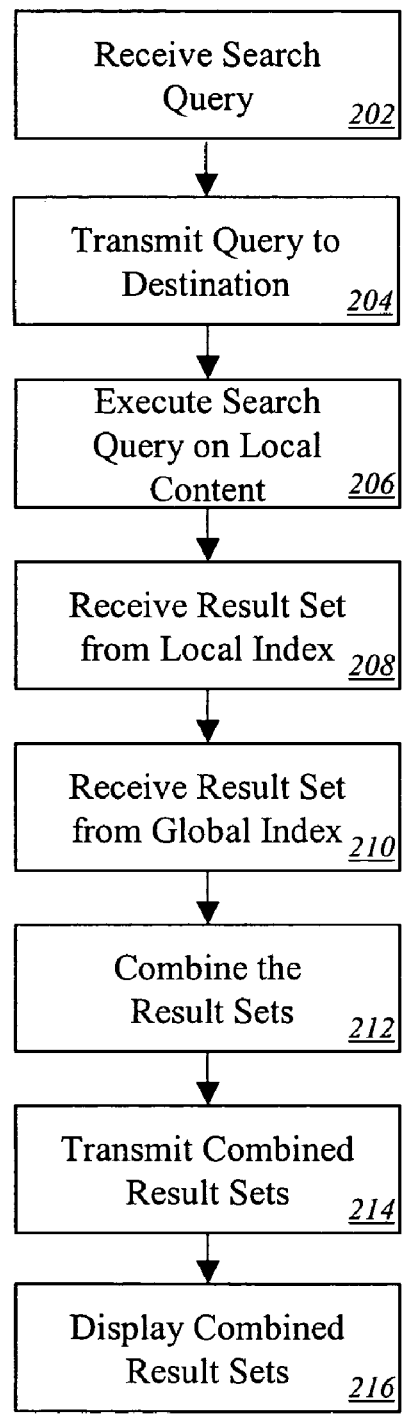
FIG. 2 is a flowchart illustrating generating a user interface in one embodiment of the present invention.

FIG. 2 is a flowchart illustrating generating a user interface in one embodiment of the present invention. In the embodiment shown, a user 112a enters a search query 114. For example, the user 112a may access the Google™ web site and enter a search query. In a conventional process, the search query 114 would be sent directly or indirectly to the Google™ search engine. However, in an embodiment of the present invention, the local search engine 122 intercepts the search query 114.

The user 112a is likely to be familiar with performing a search of a global index, such as by using the Google™ search engine. Several embodiments of the present invention combine the result sets from the global and local indices into a single, unified user interface so that the user can access many types of content in a simple and effective manner. Alternative embodiments may generate two or more user interfaces, for example, one to display results from a first index and another to display results from a second index.

In one embodiment of the present invention, a local index is an index that includes information that is specific to a user. For example, a local index may comprise email threads from and to a particular user, files, and other data stored, accessed, or otherwise associated with the particular user. The local index may also or instead comprise a list of article identifiers a particular user has accessed. A global index comprises information that is not necessarily user-specific and that may be available to multiple users. One example of a global index is a web index of a search engine operating on the World Wide Web, such as the Google™ search engine.

Also, an embodiment of the present invention may recognize an implicit or explicit search performed by a user 112a and, in response, perform a search of a local index to be combined with results from a global index. For example, the user 112a may click on a link, causing a search to occur. An embodiment of the present invention may recognize the click on the link and the subsequent request as a search request.

Referring to FIG. 2, the local search engine 122 receives the search query 202. For example, the local search engine 122 may monitor network traffic and intercept a query directed to the search engine 170, e.g., via the network 106 to the Google™ search engine 204. The search engine 122 then executes the search query 114 on the local index stored in the data store (140) 206. The search engine 122 then receives a result set from the local index 208. The result set comprises a list of article identifiers.

For example, the user 112a enters a search for "digital camera." The search engine 122 intercepts this search query causes it to be executed against the local index. In response, the search engine 122 receives a result set from the local index which may comprise various types of information concerning the user's local activity, data, files, and applications, such as email threads, documents, and other local content stored in the data store 140 or elsewhere.

Referring still to FIG. 2, the search engine 122 receives a result set from the global index 210. In one embodiment, the result set is returned as a standard search results HTML document. In another embodiment, the search results are returned as XML or textual data. Other formats may also be returned. The search engine 122 next combines the result sets from the global and local index 212.

The result sets may be combined in numerous ways. For example, in one embodiment, the result sets are combined within a user interface that is displayed, but the lists of article identifiers remain separate. In another embodiment, the result sets are combined into a single list in which the result set from the local index appears first in the combined result set, and the result set from the global index appears last in the combined result set. In another embodiment, a ranking measure from the search engine is used to rank each article identifier in each result set to create the combined list. In such an embodiment, the article identifiers are combined into a single list, and the highest ranked article identifier appears first in the list. The second highest article identifier appears second, and so on until each of the article identifiers is placed in the combined list.

In another embodiment, results are ranked and are also weighted based on which index they were received from. For example, in one embodiment, article identifiers received from a local index are weighted higher than article identifiers from a global index. In such an embodiment, an article identifier from a local index may appear above an article identifier from a global index even though the ranking of the article identifier from global index is higher. Once the search engine 122 has generated a user interface that combines the result sets from the local and global indices, the search engine 122 transmits 214 the page to the display processor 128, which causes the user interface to be displayed 216 to the user 112a.

The display processor 128 may display the combined results in various ways. For example, in one embodiment, the local results are segregated from the global results, for example appearing on a particular side of the user interface. In another embodiment, the individual article identifiers are interspersed within the global result set to create a page closely resembling a results page returned from a conventional search of a global index. In another embodiment, the result sets from each of the global and local index are ranked and/or ordered based on preferences of the user 112a or based on other attributes.

Although the process shown in FIG. 2 is described as being performed by the search engine 122 primarily, various other components on the client 102a or on another device may also perform these functions. For example, in one embodiment, a plug-in for the browser intercepts the query, causes a local search to be performed, and then combines the results from the global index with the results from the local index. In another embodiment, a firewall executing on the client 102a performs a process according to the present invention. The firewall may include a module or modules to handle encryption and decryption of content. In yet another embodiment, a proxy server performs a process according to the present invention.

Embodiments of the present invention may perform the process shown in slightly different ways depending on when they intercept the query and the content. For example, a browser plug-in may read HTML directly from the browser after the result set from the global index is displayed and then change the page by inserting local results. In contrast, a firewall reads the data off the wire (i.e., the data stream that is received and transmitted) and modifies the information before it is passed to the browser. One embodiment may be preferred over another in certain environments, but all are capable of providing the combined result set to the user 112a.

In one embodiment, if results from the local index are not available by the time results are received from the global index, the results from the local index are not included in the results output to the user 112a. In such an embodiment, the user 112a does not experience a delay related to a search of the local index.

The display processor 128 shown in FIG. 1 may display the information received and combined by the search engine in various ways. For example, in one embodiment, the result set from the search of the local index appears in a box at the top of the page separate from the results set from the global index (sometimes referred to as a "one-box" user interface). In another embodiment, the result sets from the local and global index are merged and appear as a single integrated list. In yet another embodiment, the result set from the local index is separated by document or article type and is displayed separately from the result set from the global index.

Figure 3:
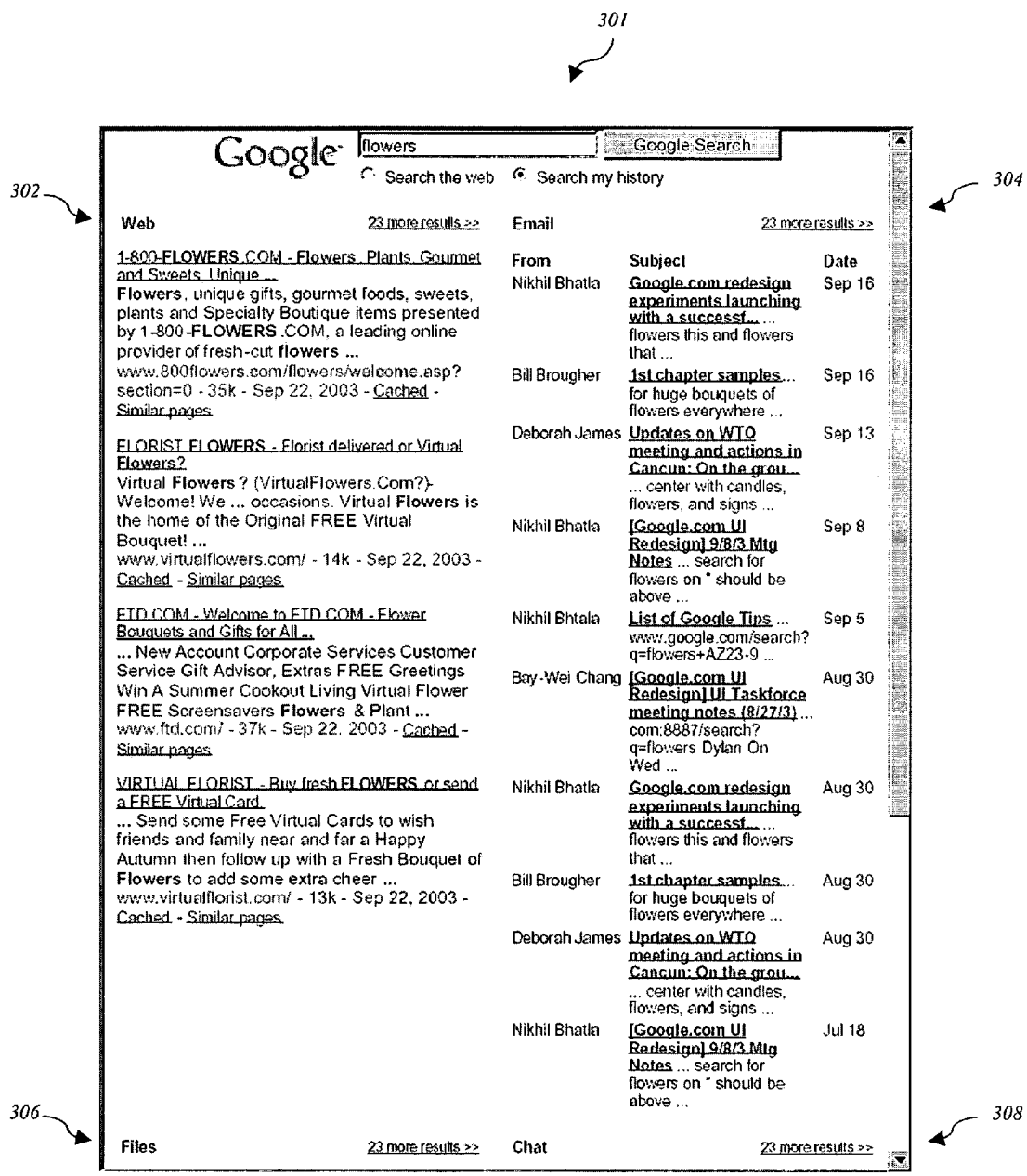
FIG. 3 is a screen shot illustrating the user interface generated by the process shown in FIG. 2.

FIG. 3 is a screen shot illustrating information displayed in an HTML document in one embodiment of a user interface 301 constructed according to the method shown in FIG. 2. The user interface 301 shown comprises an HTML document. The HTML document 301 shown comprises four sections 302-308. The first section 302 comprises a result set or a portion of a result set containing results from the global index. In the process illustrated in FIG. 2, the Internet represents the global index as described in FIG. 2.

The second section 304 comprises a result set comprising article identifiers of email threads retrieved from the local index in the data store 140. In the embodiment shown, the email thread comprises a series of related messages. The messages may be related by sender, recipient, subject, and/or content of the message, or based on other attributes of the message. Taken together, the email messages form a thread, a type of article or document that the user 112a can access by clicking on the article identifier.

The third section 306 of the embodiment shown comprises a result set comprising files retrieved from the local index in the data store 140. The search engine 122 may retrieve the article identifiers associated with both the files and other articles in a single step. Alternatively, the search engine 122 may execute steps 206 through 210 repeatedly to retrieve various types of articles.

The fourth section 308 comprises a result set comprising chat messages or chat message threads retrieved from the local index in the data store 140. As with the email section 302, the chat section 308 is retrieved in steps 206 through 210 of FIG. 2. The email and chat messages may be retrieved simultaneously by the search engine 122 and separated by the display processor 128 into the section shown in FIG. 3 or may be retrieved separately by repeating steps 206 through 210 for each section 302, 308 of the interface shown.

The four sections 302-308 and the layout of the display shown in FIG. 3 are merely exemplary of how an HTML document may be constructed according to the present invention. For example, a user 112a may select different, fewer, or additional categories to display on the HTML document. In one embodiment, the user 112a accesses an administration page to vary the layout of the HTML document shown in FIG. 3 as desired.

In alternative embodiments of the present invention, the search query 114 issued by the user 112a may be modified before being submitted to the local search engine 122. For example, in one embodiment, the search query 114 is transformed before being submitted to the search engine 122. Transformation may include substitution of terms in the search query 114 with related words, such as synonyms, or by some other method. Modification of the search query 114 may comprise methods other than transformation as well. Modification of the search query 114 may result in a more effective search of the local index.

The foregoing description of the exemplary embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method of providing combined search results on a client device, the method comprising:
    generating and storing in a memory of the client device a local index of a plurality of articles associated with at least one of a user or the client device and stored on the client device, each article having an article type from a plurality of article types, wherein each article type indicates a computer readable data format for an article;
    executing on the client device a search query on the local index to produce a first result set of articles relevant to the search query, the first result set referencing a plurality of articles having different article types;
    receiving on the client device from a remote search system a second result set from a search of a global index, the second result set relevant to the search query;
    receiving, from the user, a selection of user-defined display parameters, including a selection of article types to be displayed at the client device;
    generating on the client device a user interface based on the selection of article types to be displayed, wherein the user-interface includes a plurality of spatially segregated sections of a display of the client device, wherein each of the segregated sections is associated with one of the selected article types; and
    displaying the first and second result sets to the user in the generated user interface of the client device, wherein the plurality of articles in the first result sets are displayed in the plurality of segregated sections according to their article types.

2. The method of claim 1, wherein executing on the client device a search query further comprises intercepting a search query input at the client device directed to the remote search system.

3. The method of claim 1, further comprising ranking the combined display of the result sets.

4. The method of claim 1, wherein the combined display of the result sets comprises a merged result set.

5. The method of claim 1, wherein the user interface- is comprised of a first section for displaying the first result set and a second section for displaying the second result set.

6. The method of claim 1, wherein generating on the client device a user interface including a combined display of the first result set and the second result set comprises:
    identifying a first article identifier in the first result set; and
    replacing a second article identifier in the second result set with the first article identifier.

7. The method of claim 1, wherein executing on the client device the search query comprises receiving the search query in a proxy server.

8. The method of claim 1, wherein executing on the client device the search query comprises receiving the search query in a browser plug-in.

9. A computer-readable storage medium on which is encoded program code for providing combined search results on a client device, the program code comprising:
    program code for generating and storing in a memory of the client device a local index of a plurality of articles associated with at least one of a user or the client device and stored on the client device, each article having an article type from a plurality of article types, wherein each article type indicates a computer readable data format for an article;
    program code for executing on the client device a search query on the local index to produce a first result set of articles relevant to the search query, the first result set referencing a plurality of articles having different article types;

program code for receiving on the client device from a remote search system a second result set from a search of a global index, the second result set relevant to the search query;

program code for receiving, from the user, a selection of user-defined display parameters, including a selection of article types to be displayed at the client device;

program code for generating on the client device a user interface based on the selection of article types to be displayed, the user interface including a combined display of the first result set and the second result set, wherein the user-interface includes a plurality of spatially segregated sections of a display of the client device wherein each of the segregated sections is associated with one of the selected article types; and program code for displaying the first and second result sets to the user in the generated user interface wherein the first and second result sets are segregated in the user interface and the plurality of articles in the first result set are displayed in the plurality of segregated sections according to their article types.

10. The method of claim 1, wherein the article type is text-based files.

11. The method of claim 1, wherein the article type is email.

12. The method of claim 1, wherein the article type is message text derived from a chat application.

13. The method of claim 1, wherein the local index is not publicly accessible.

14. The method of claim 1, wherein the article type is an audio file.

15. The method of claim 1, wherein the article type is a video file.

16. The method of claim 1, wherein the article type is a Portable Document File (PDF).

17. The method of claim 1, wherein the article type is a web page comprised of markup language.

18. The method of claim 1, further comprising generating on the client device the user interface based upon user-supplied display format parameters.

19. A method of providing combined search results on a client device, the method comprising:

generating and storing in a memory of the client device a local index of a plurality of articles associated with at least one of a user or the client device and stored on the client device, each article having an article type from a plurality of article types, wherein each article type indicates a computer readable data format for an article;

identifying a global query directed to a remote search system comprising a global index;

executing on the client device a local query on the local index, wherein the local query is based at least in part on the global query, the local query producing a first result set of articles relevant to the local query, the first result set referencing a plurality of articles having different article types;

receiving on the client device from the remote search system a second result set from the global query of the global index;

receiving, from the user, a selection of user-defined display parameters, including a selection of article types to be displayed at the client device;

generating on the client device a user interface based on the selection of article types to be displayed, the user interface including a combined display of the first result set and the second result set, wherein the user-interface includes a plurality of spatially segregated sections of a display of the client device wherein each of the segregated sections is associated with one of the selected article types; and displaying the combined display of the result sets in the generated user interface, wherein the first and second result sets are segregated in the user interface and the plurality of articles in the first result set are displayed in the plurality of segregated sections according to their article types.

20. The method of claim 19, wherein the local query and the global query occur in parallel.

21. The method of claim 19, further comprising ignoring the result set from the local index if the result set from the local index is not received within a predetermined time after the result set from the global index is received.

22. The method of claim 19, wherein creating a combined display of the result sets based at least in part on the result set from the global index and the result set from the local index comprises modifying the result set from the global index.

23. The method of claim 19, wherein creating a combined display of the result sets based at least in part on the result set from the global index and the result set from the local index comprises creating a new display, wherein the result set from the local index and the result set from the global index are contained in separate sections.

24. The method of claim 19, wherein creating a combined display of the result sets based at least in part on the result set from the global index and the result set from the local index comprises creating a new display combining the result set from the local index and the response from the global index.

25. The method of claim 19, wherein the article type is text-based files.

26. The method of claim 19, wherein the article type is email.

27. The method of claim 19 wherein the article type is message text derived from a chat application.

28. The method of claim 19, wherein the article type is an audio file.

29. The method of claim 19, wherein the article type is a video file.

30. The method of claim 19, wherein the article type is a Portable Document File (PDF).

31. The method of claim 19, further comprising generating on the client device the user interface based upon user-supplied display format parameters.

32. A computer-readable medium on which is encoded program code for providing combined search results on a client device, the program code comprising:

program code for generating and storing in a memory of the client device a local index of a plurality of articles associated with at least one of a user or the client device and stored on the client device, each article having an article type from a plurality of article types, wherein each article type indicates a computer readable data format for an article;

program code for executing on the client device a search query on the local index to produce a first result set of articles relevant to the search query, the first result set referencing a plurality of articles having different article types;

program code for receiving on the client device from a remote search system a second result set from a search of a global index, the second result set relevant to the search query;

program code for receiving, from the user, a selection of user-defined display parameters, including a selection of article types to be displayed at the client device;

program code for generating on the client device a user interface based on the selection of article types to be displayed, the user interface including a combined display of the first result set and the second result set, wherein the user-interface includes a plurality of spatially segregated sections of a display of the client device wherein each of the segregated sections is associated with one of the selected article types; and program code for displaying the first and second result sets to the user in the generated user interface wherein the first and second result sets are segregated in the user interface and the plurality of articles in the first result set are displayed in the plurality of segregated sections according to their article types.

33. The computer-readable medium of claim 32, further comprising program code for ranking the combined display of the result sets.

34. The computer-readable medium of claim 32, wherein program code for generating on the client device a user interface including a combined display of the first result set and the second result set comprises:

program code for identifying a first article identifier in the first result set; and program code for replacing a second article identifier in the second result set with the first article identifier.

35. The computer-readable medium of claim 32, wherein program code for executing the search query comprises program code for receiving the search query in a proxy server.

36. The computer-readable medium of claim 32, wherein program code for executing the search query comprises program code for receiving the search query in a browser plug-in.

37. The computer-readable medium of claim 32, wherein the article type is text-based files.

38. The computer-readable medium of claim 32, wherein the article type is email.

39. The computer-readable medium of claim 32, wherein the article type is message text derived from a chat application.

40. The computer-readable medium of claim 32, wherein the article type is an audio file.

41. The computer-readable medium of claim 32, wherein the article type is a video file.

42. The computer-readable medium of claim 32, wherein the article type is a Portable Document File (PDF).

43. The computer-readable medium of claim 32, further comprising program code for generating on the client device the user interface based upon user-supplied display format parameters.

* * * * *